Oct. 20, 1936.                W. H. DE LANCEY                2,058,138
                        LIQUID DISPENSING APPARATUS
                    Filed Feb. 23, 1935        7 Sheets-Sheet 1
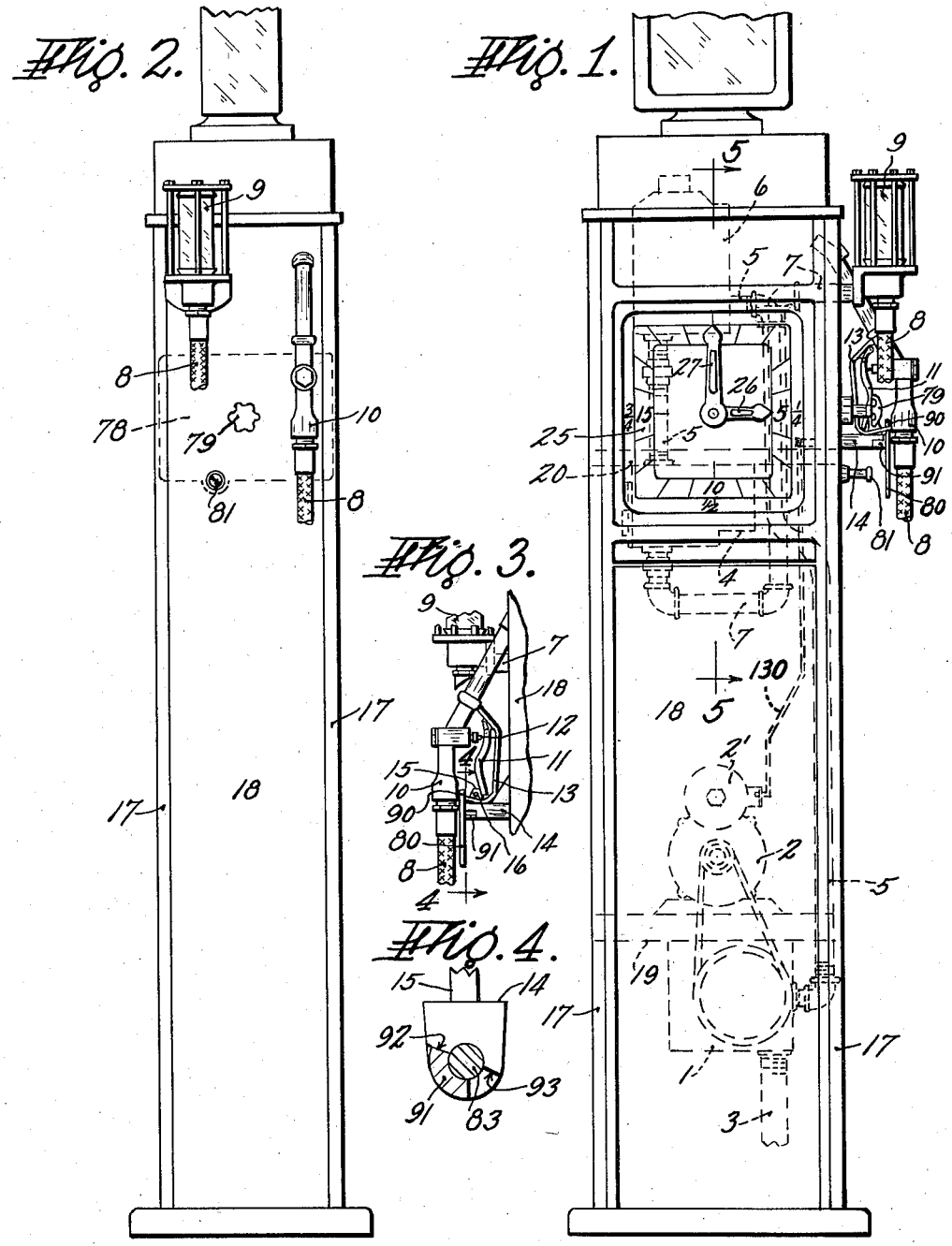
INVENTOR
WARREN H. DE LANCEY
BY
Chapin & Neal
ATTORNEYS

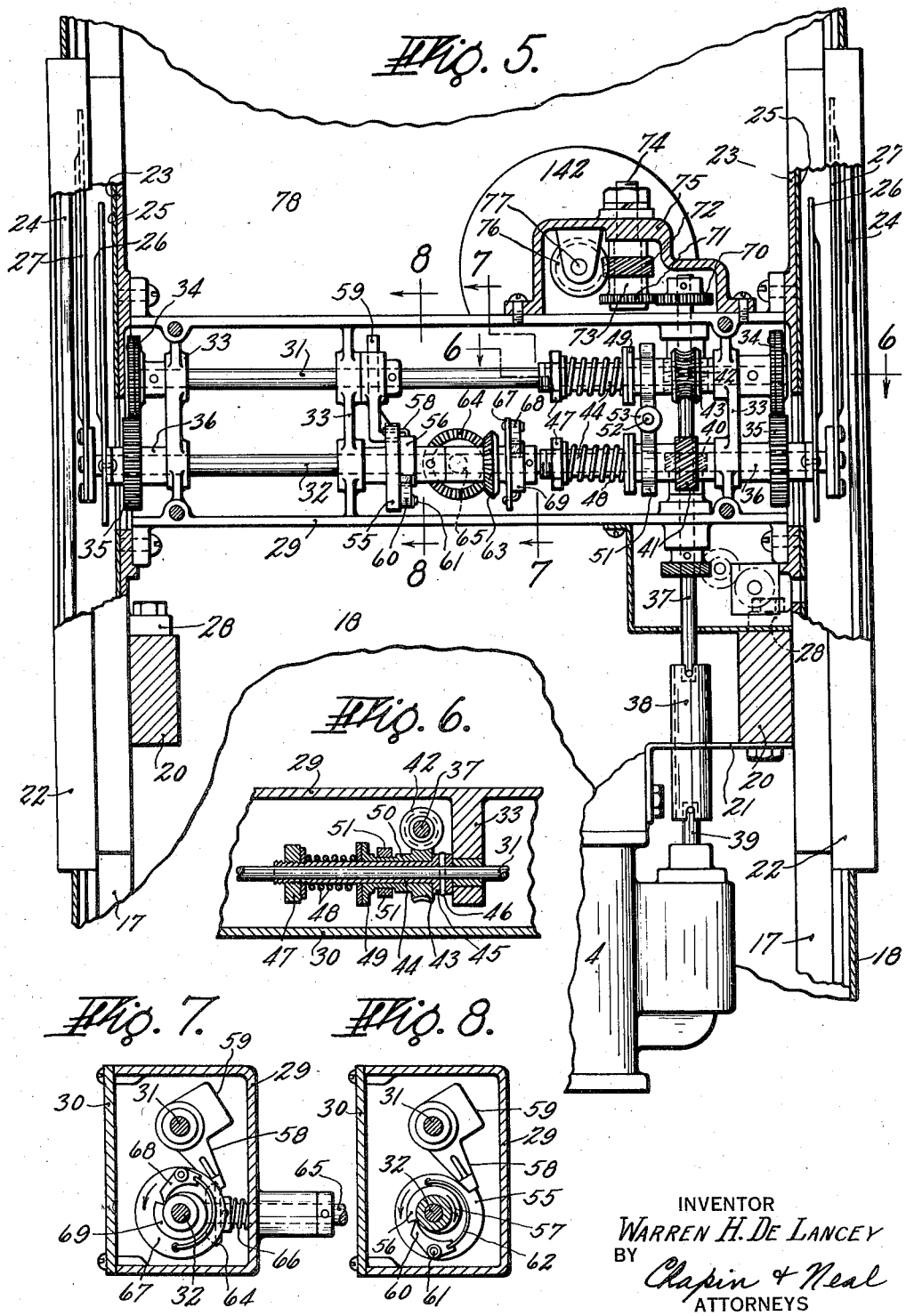

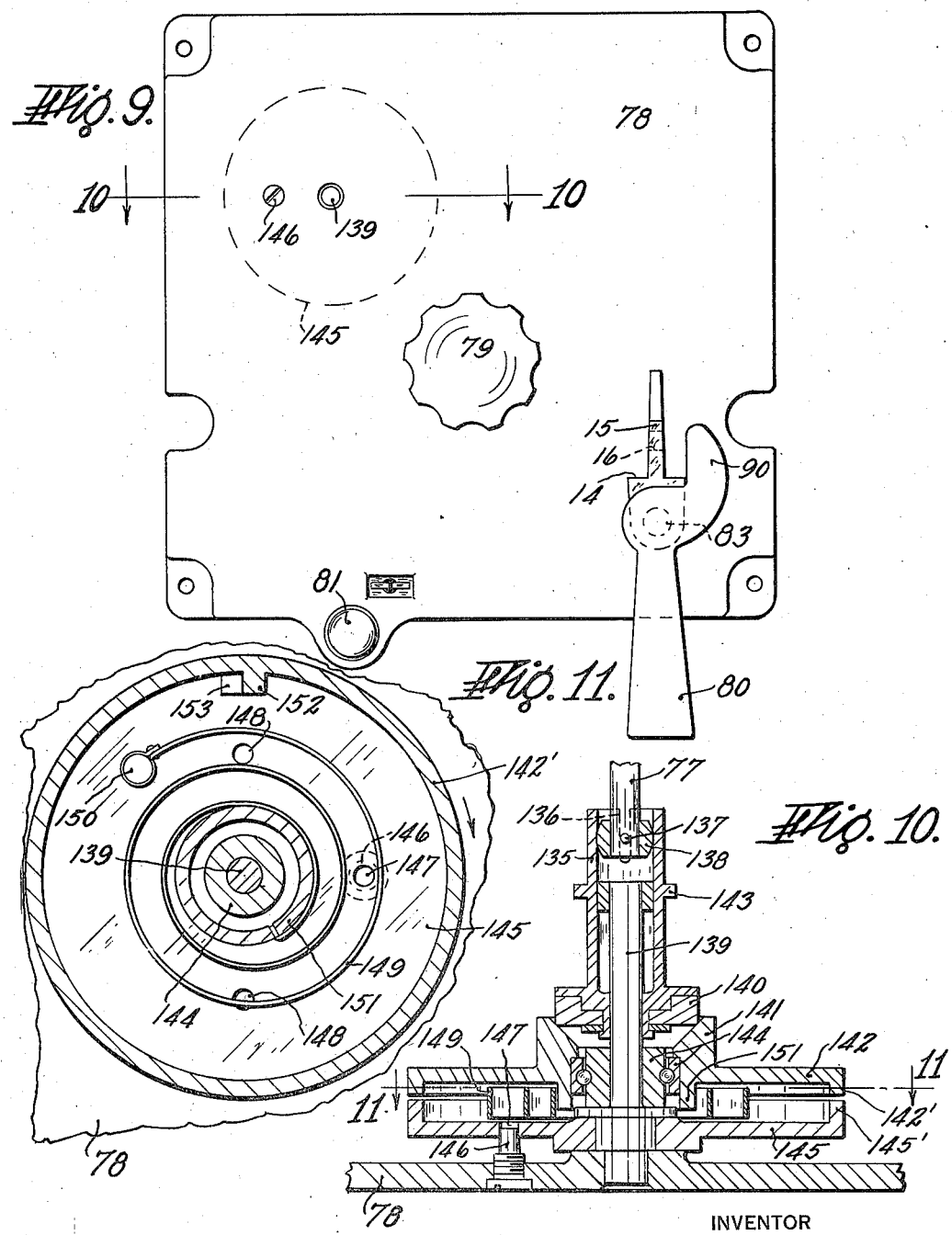

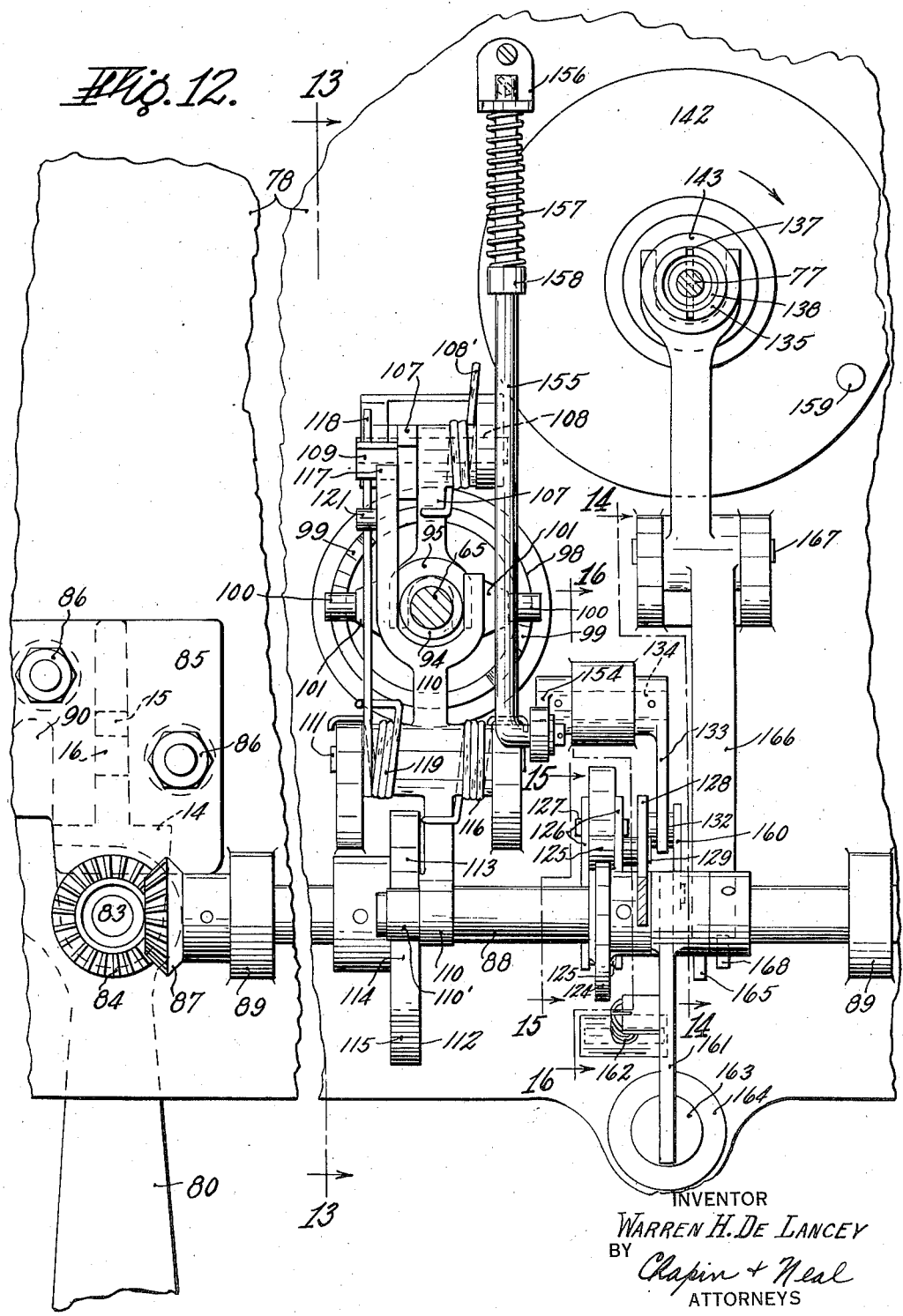

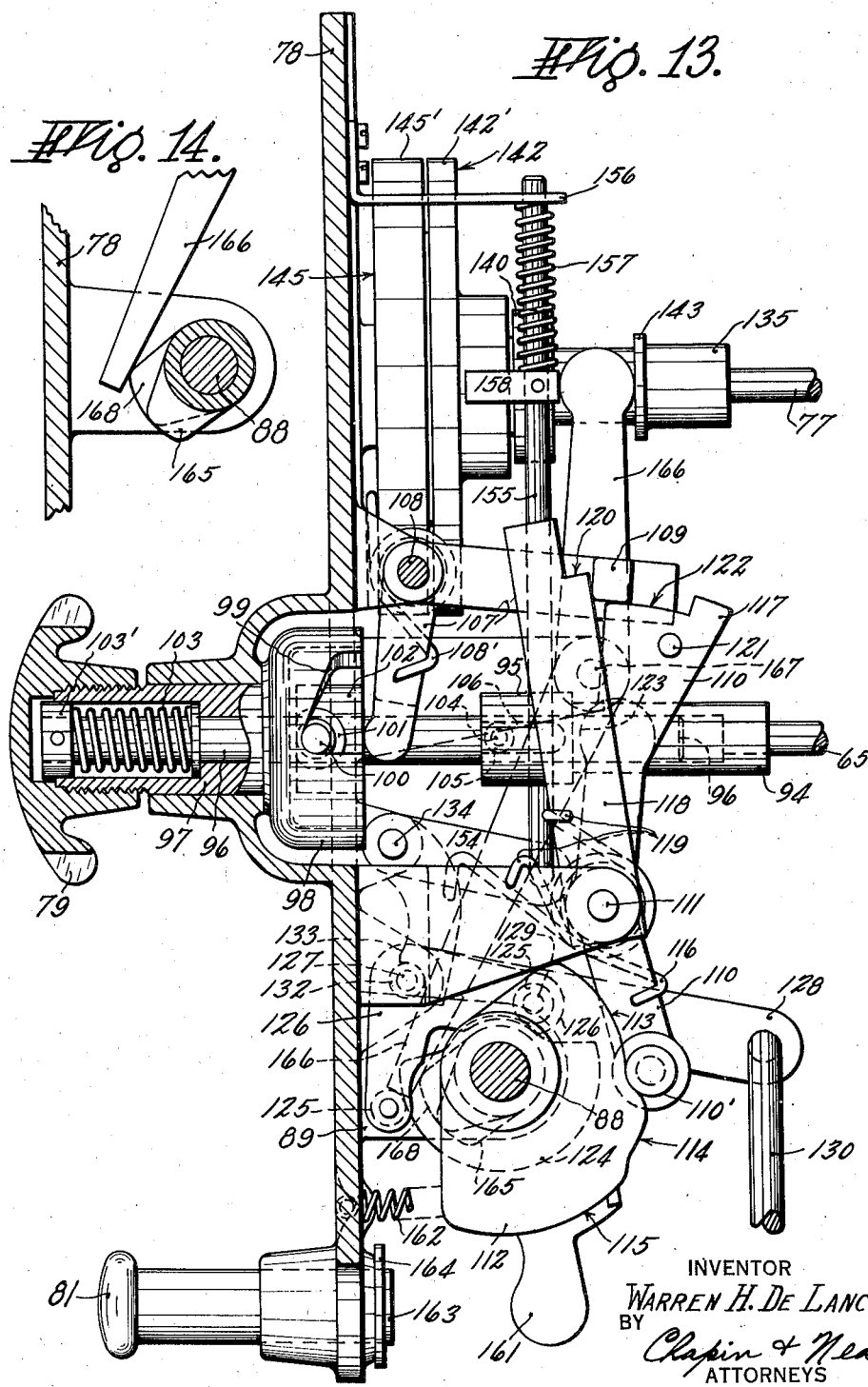

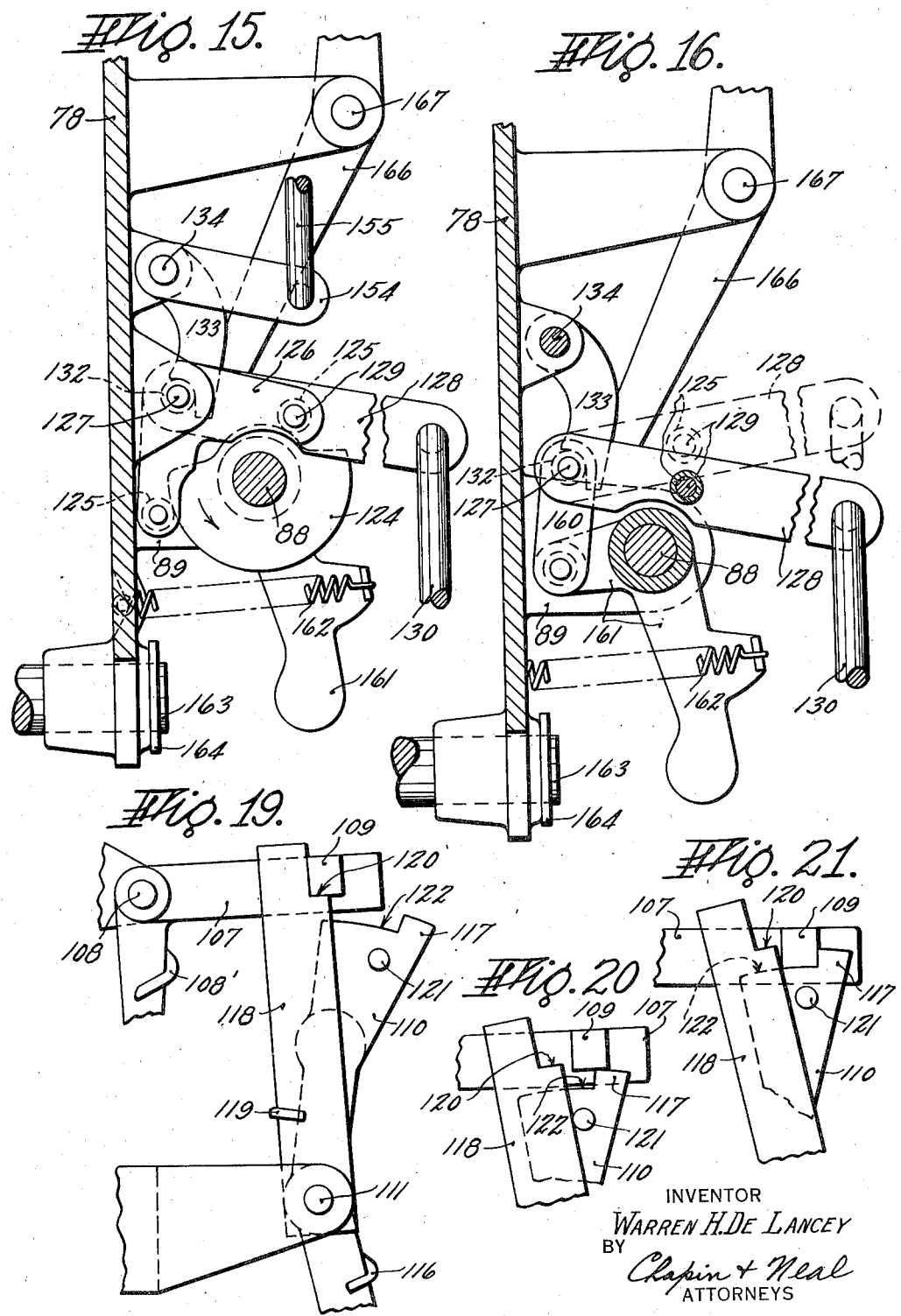

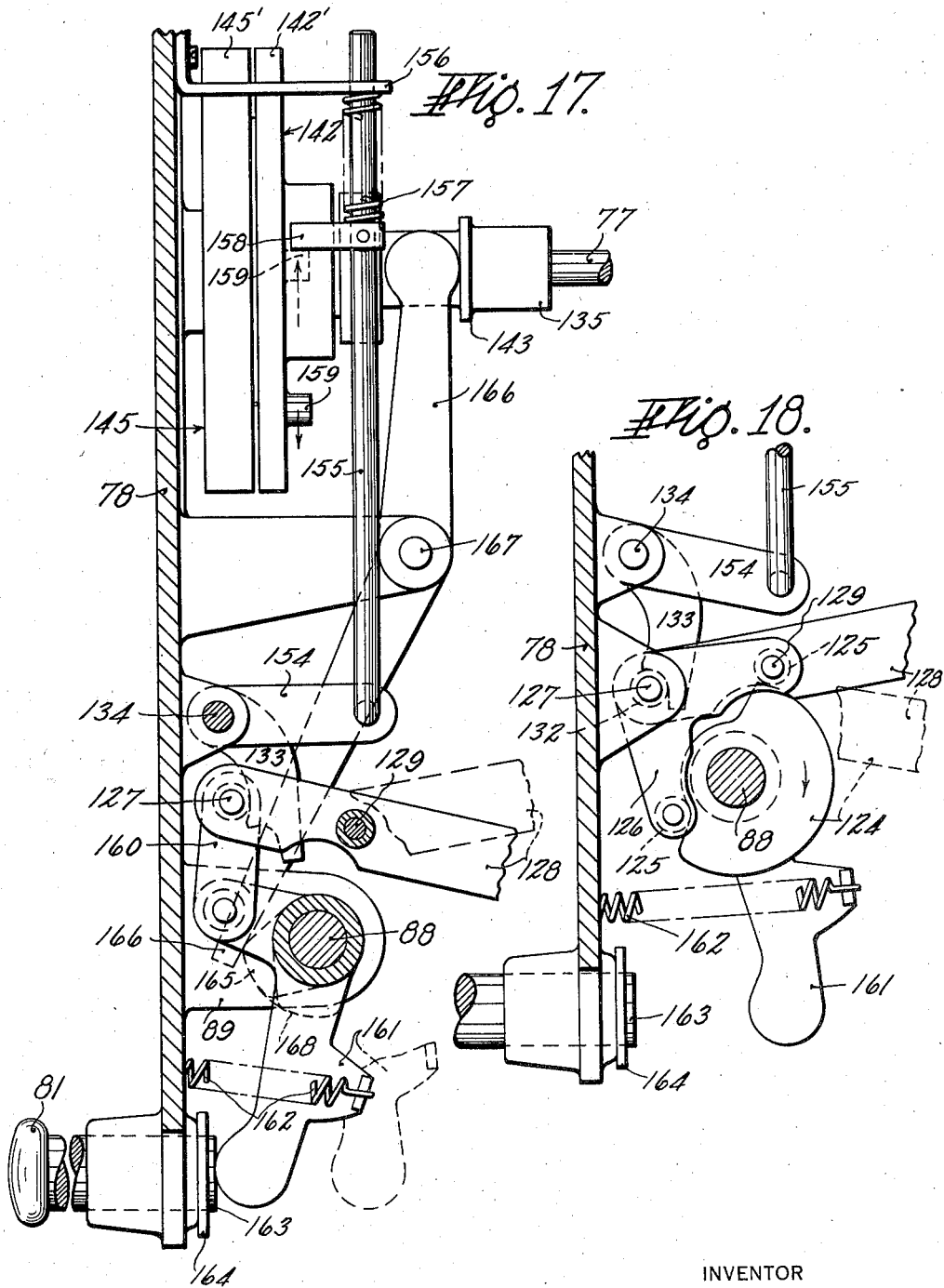

Patented Oct. 20, 1936

2,058,138

UNITED STATES PATENT OFFICE 2,058,138

LIQUID DISPENSING APPARATUS

Warren H. De Lancey, Springfield, Mass., assignor to Gilbert & Barker Manufacturing Company, West Springfield, Mass., a corporation of Massachusetts Application February 23, 1935, Serial No. 7,753

16 Claims. (Cl. 221—95)

This invention relates to improvements in liquid dispensing apparatus of the so-called meter type, such as is commonly used for dispensing gasoline, oils and the like.

The invention has for one object the provision of improved means for compelling the resetting of the movable quantity-indicating element of the meter as a condition precedent to operation of the pump and the dispensing of liquid from the apparatus.

The invention also has for an object to provide an automatic means for stopping the pump after a certain predetermined quantity of liquid has been delivered from the apparatus.

Another object of the invention is to provide in an apparatus of the class described, a single control element such, for example, as a switch for starting and stopping the pump and to provide for the operation of this switch by the usual manual control and also to arrange for its operation by the aforesaid automatic means, which stops the pump when a certain quantity of liquid has been delivered.

A further object is to provide manually-operated means, effective without requiring resetting of the quantity-indicating element of the meter, for again starting the pump after it has been stopped by the aforesaid automatic means.

A further object of the invention is to provide for the resetting of the quantity controlling element of the automatic pump-stopping means either by said means or by the usual manually-operated means, the resetting occurring in each case during the act of stopping the pump.

These and other objects will appear as the detailed description proceeds and will be pointed out in the appended claims.

The invention will be disclosed with reference to the accompanying drawings, in which:

Fig. 1 is a small-scale, exterior elevational view of a gasoline dispensing apparatus embodying the invention;

Fig. 2 is an exterior view of the apparatus taken from the right of Fig. 1;

Fig. 3 is a fragmentary elevational view taken in the opposite direction from Fig. 1 and showing the hose nozzle and its support;

Fig. 4 is a sectional view taken on the line 4—4 of Fig. 3;

Fig. 5 is an enlarged fragmentary sectional view taken on the line 5—5 of Fig. 1;

Figs. 6, 7 and 8 are sectional views taken on the lines 6—6, 7—7 and 8—8, respectively, of Fig. 5;

Fig. 9 is a front view of the control panel;

Fig. 10 is a sectional plan view taken on the line 10—10 of Fig. 9, showing the limit control disc;

Fig. 11 is a sectional view taken on the line 11—11 of Fig. 10;

Fig. 12 is a rear view of the panel shown in Fig. 9;

Fig. 13 is a cross sectional view taken on the line 13—13 of Fig. 12;

Figs. 14, 15 and 16 are fragmentary cross sectional views taken on the lines 14—14, 15—15 and 16—16, respectively, of Fig. 12;

Figs. 17 and 18 are views taken similarly to Figs. 16 and 15, respectively, but showing the parts in different relative positions; and Figs. 19, 20 and 21 are fragmentary cross sectional views, taken similarly to Fig. 13 and showing the various stages of operation of the locking mechanism.

Referring first to Fig. 1 of these drawings; there is shown more or less in conventional form, a power driven gasoline dispensing apparatus of the so-called meter type. A suitable rotary pump 1, driven by an electric motor 2, draws gasoline through a suction pipe 3 from a suitable storage tank (not shown) and forces the liquid upwardly through piping 5 to a suitable meter 4. The control element, in this case, consists of a switch 2' for starting and stopping the motor. Interposed in piping 5 is a device 6 for freeing the liquid of air just prior to the entrance of the liquid to the meter. The outlet of the meter is connected by piping 7 to a flexible hose 8, usually through the intermediary of a sight flow indicator 9. On the delivery end of the hose is a nozzle 10 (Fig. 3) having the usual self-closing valve and an operating lever 11 which, when moved to the left from the position shown, will engage and move the stem 12 of the nozzle valve and open the latter. The nozzle 10 also has a guard 13 for lever 11. When not in use, the nozzle is hung up by resting the lower portion of this guard 13 upon a fixed, shelf-like support 14 having an upstanding lug 15, which passes through a slot in such portion, and holds the nozzle against displacement on its support in all directions other than vertically upward. The lug 15 is perforated, as at 16, to receive a padlock whereby the nozzle may be locked to its support. The lug 15 may if desired serve also to block an opening movement of the valve lever 11 while the nozzle is hung up on its support as will be clear from Fig. 3.

The apparatus, except for the hose 8, its nozzle 10, the nozzle support 14, indicator 9, and certain control members later to be described, is usually enclosed in a suitable housing, such as that shown, which comprises four corner posts 17 and sheet metal panels 18 extending therebetween. To the posts 17 is fixed a plate 19, supporting both the pump and motor, and above this plate two cross bars 20, one of which is shown completely in Fig. 1 and both of which appear in section in Fig. 5. These bars 20 serve to support the meter 4, as indicated in part by the bracket 21 (Fig. 5). They also support the registers and the driving means therefor.

One or more registers are provided to indicate the quantities of liquid dispensed. As shown in Fig. 5, two registers are provided, one on each of two opposite sides of the apparatus. Each register includes a hollow box-like casing 22, mounted in an opening in one of the panels 18. Each casing 22 has a solid inner wall 23 and its outer wall 24 is transparent. Within the casing 22 is fixed a dial 25, having inner and outer series of graduations (Fig. 1) with which indicating hands 26 and 27, respectively, cooperate. The long hand 27 is intended to make one complete revolution for each unit quantity dispensed, while the short hand 26 shows on the inner graduated scale the number of such unit quantities dispensed.

On the rear wall 23 of each register are lugs 28 which rest upon and are bolted to the adjacent cross bar 20. Extending between the two walls 23 and secured at its ends, one to each such wall, is a horizontally disposed cross member 29 of channel-shaped cross section. A cover plate 30 (Fig. 7) secured as indicated to member 29, cooperates therewith to form a housing for most of the register driving mechanism.

This mechanism is largely of the conventional type. It includes upper and lower horizontally-disposed shafts 31 and 32, mounted within the housing and in bearings 33 provided therein. The lower shaft 32 extends through the rear wall 23 of each register casing to drive the hands 27 which are fixed one to each end of the shaft. The upper shaft 31 terminates short of such walls and has fixed to each end a gear 34 which drives an underlying gear 35. Gear 35 is part of a sleeve 36 which is mounted to turn freely on shaft 32 and has fixed thereto the indicator hand 26. Shafts 31 and 32 are driven from a vertical shaft 37 but at different rates and in opposite directions. As shown, the shaft 31 is driven at one-twentieth the rate at which shaft 32 is driven. Shaft 37 is mounted in bearings in the upper and lower flanges of member 29 and its lower end is connected by a suitable flexible coupling 38, with the driven shaft 39 of meter 4. Fixed to shaft 37 is a spiral gear 40 which drives a similar gear 41 on shaft 32, and a worm 42 which drives a worm gear 43 on shaft 31.

Gears 41 and 43 are connected to their respective shafts in the manner shown in Fig. 6 in connection with gear 43. Such gear is free to turn on a sleeve 44. One end of this sleeve has a flange 45 which is pinned at 46 to shaft 31. The other end of sleeve 44 is threaded to receive a nut 47. A spring 48, coiled around sleeve 44 acts between the adjustable abutment 47 and a flange 49 on the hub 50 of gear 43 to press the latter against flange 45. The gear 43 thus drives shaft 31 through the intermediary of a friction clutch and the gear 41 drives its shaft 32 in the same way. This enables both shafts 31 and 32 to be turned to reset hands 26 and 27 to zero without turning the gears 41 and 43 and shaft 37. The hub 50 is grooved (Fig. 6) to receive the substantially semi-circular ends of two friction plates 51. These plates are drawn together by a bolt 52 (Fig. 5) and nut 53. This pair of plates acts as a friction drag for both gears 41 and 43. By having the friction device act on the gears rather than the shafts driven thereby, resetting of the pointers is accomplished with less effort because the shafts only need to be turned for this purpose and they are free from the drag of the friction device.

Stops are provided for each of the indicator hands, as shown in Figs. 5 and 8. Loosely mounted on shaft 32 is a cam 55 and adjacent thereto and fixed to shaft 32 is a similar but smaller cam 56. The arrow 57 shown in Fig. 8 indicates the direction of travel of the cams while being driven by the meter shaft 37. Shaft 32 will be turned in the opposite direction by means later to be described, to reset the hands to zero. When the hands are both at zero, the abrupt radial face of cam 55 will be engaged by the end of a pawl 58, mounted to turn freely on shaft 31 and constantly urged by its weighted extension 59 into engagement with the spirally-shaped surface of the cam. Also, the abrupt radial face of the correspondingly formed cam 56 will be engaged by the free end of a pawl 60, pivoted at 61 to cam 55 and urged by a spring 62 into engagement with the spiral surface of the cam. During operation of the meter, shaft 32 will turn in a clockwise direction as viewed in Fig. 8, and the radial face of cam 56 will move away from pawl 60. Cam 55 will also turn in the same direction but at a slower speed and thus will carry the radial face of cam 55 away from pawl 58. Shaft 32 will usually make several revolutions and the nature of cam 56 is such that it may do so. The cam 55 is similarly constructed for similar reasons although the indicator hand 26 will not ordinarily make more than one complete revolution. The resetting of the hands is effected by turning shaft 32 in a direction opposite to that indicated by the arrow 57 in Fig. 8. The first action is to turn cam 56 and thus the indicator 27 without moving cam 55 or the indicator 26. This action continues until the radial face of cam 56 engages the free end of pawl 60, whereupon the cam 55 will be turned with shaft 32. On continued turning of shaft 32 in the same direction, cam 53 will be moved until the radial face of cam 55 is arrested by the abutment with the free end of pawl 58. Both hands 26 and 27 will then be restored to zero position. Thus, in resetting, the indicator 27 is moved back until it overlies and coincides in position with the indicator 26. Then both indicators move in unison to zero position, the pawl 58 serving as the zero stop for both.

The shaft 32 (Fig. 5) is connected by bevel gears 63 and 64 to a shaft 65 which is mounted to rotate as well as to slide axially to a limited extent in a bearing (Fig. 7) provided in the rear wall of member 29. A spring 66 interposed between such wall and the gear 64, which is fixed to shaft 65, tends to move gear 64 into mesh with gear 63. But the shaft 65 may be pulled axially outward (to the right in Fig. 7) to disengage gear 64 from gear 63, by means later to be described. It may also be rotated, when the gears 63 and 64 are engaged, to reset the pointers of the register. Means are provided to prevent the operator from turning the pointers ahead by operation of shaft 65 and such means are shown in Figs. 4 and 7. The gear 63 is free to turn on shaft 32 and has fixed thereto a plate 67 which carries a pivoted pawl 68, spring pressed toward a one tooth ratchet 69, fixed to shaft 32. Thus, gear 64 can drive shaft 32 in a counterclockwise direction, as required to enable resetting of the pointers 26 and 27, but is unable to drive the shaft in the clockwise direction necessary to set the pointers ahead on the dial.

The meter-driven shaft 37 is extended through the upper wall of member 29 (Fig. 5) and its upper end has fixed thereto a spur gear 70 which drives a spur gear 71 formed integrally with a spiral gear 72 on a sleeve 73, mounted on a stud 74, fixed to a housing 75, fastened to said upper wall. Meshing with gear 72 is a gear 76 fixed to one end of a shaft 77, mounted in housing 75. Shaft 77 is adapted to drive a quantity-limiting device which predetermines the maximum quantity of liquid that can be delivered at one operation from the apparatus.

Fixed to one pair of columns 17 beneath the plate 18 of the pump housing shown in Fig. 2 is a panel 78, on which all the control apparatus is mounted. On the exterior of this panel (Fig. 9) is a resetting knob 79, for turning shaft 65 to reset the pointers of the register; the hose nozzle support 14; an operating member,—in this case a lever 80, is provided for actuating the control element 2' to start and stop the pump motor 2 by manual control; and a knob 81, which when pressed in will reset the apparatus for the delivery of an additional quantity of liquid after the apparatus has been automatically stopped by the limiting or predetermining device which is driven by shaft 77.

The lever 80 is fixed to the outer end of a shaft 83 (Figs. 4 and 9) which is mounted in the nozzle support 14, below the nozzle supporting surface thereof, and extends into the pump housing carrying on its inner end a bevel gear 84 (Fig. 12). The support 14 has on its inner end a flange 85 which lies above gear 84 and is fixed by bolts 86 to the panel 78. The gear 84 drives through a gear 87 a cam shaft 88 which is mounted in bearings 89 on the inner face of panel 78. This cam shaft 88, together with gears 84 and 87 and shaft 83, form part of a driving transmission which connects the member 80 to the control element 2'. The lever 80 has an upstanding lug 90 and the nozzle 10, when in place on its support 14, as shown in Fig. 1, projects beyond this support into the path of lug 90 and prevents movement of the lever in a counterclockwise direction, as viewed in Fig. 9. Movement of lever 80 in a clockwise direction is prevented by a lug 91 which abuts a shoulder 92 on the support 14, as shown in Fig. 4. Another shoulder 93 is provided on support 14 to limit the extent of movement of lever 80 in a counterclockwise direction, after it has been released for such movement by the removal of nozzle 10 from support 14. Removal of the nozzle 10 from its support is thus necessary to movement of the cam shaft 88 by lever 80. Movement of lever 80 in a counterclockwise direction, as viewed in Fig. 9, will cause movement of shaft 88 in the same direction as viewed in Figs. 13 to 18, inclusive.

The resetting shaft 65 extends from the member 29 toward the panel 78 and its outer end is fixed to one end of a sleeve 94 (Fig. 13) having a flange 95. Telescoped into the other end of sleeve 94 is the inner end of a shaft 96, which extends outwardly and into a sleeve 97. The latter is rotatably mounted in panel 78 and the reset knob 79 is fixed to and closes its outer end. Fixed to the inner end of sleeve 97 is a cup shaped member 98, the rim of which is recessed at diametrically opposite locations to form two cams 99 (see also Fig. 12), terminating with shoulders parallel to the axis of the member 98. Engaged with cams 99 and normally disposed at one end thereof and abutting one of said shoulders are rolls 100, carried by arms 101, projecting in diametrically opposed relation from a hub 102, fixed to shaft 96. A spring 103 housed within sleeve 97, acts between a shoulder on the sleeve and a collar 103' on shaft 96 to pull the shaft outwardly and hold rolls 100 engaged with cams 99. The shaft 96, near its inner end, has a pin 104 passed diametrically therethrough and on the projecting ends of this pin are rolls 105 which ride in slots 106 formed inside the flange 95,—these slots being parallel to the axis of the shaft. Thus, the shaft 96, when turned by knob 79 can turn sleeve 94, and thus shaft 65, to reset the pointers of the registers to zero. Also, the shaft 96 can be moved axially inward by cams 99. The axial movement of shaft 96 occurs after it is no longer possible to turn it, namely, after the zero stop 58 shown in Fig. 8 has arrested the shafts 31 and 32 and thus shaft 65. Then, continued movement of knob 79 in the same direction will turn member 98, causing its cams 99 through rolls 100 to force shaft 96 axially inward (to the right in Fig. 13).

This axial movement of shaft 96 is utilized to release a locking device which prevents turning of the cam shaft 88 by the control handle 80 to such an extent as to start the pump motor. A bellcrank lever 107 pivotally supported at 108 from the back wall of panel 78, has a depending arm forked to straddle shaft 96 and this lower forked end is engaged by the hub 102. A spring 108' coiled around the hub of bellcrank 107 with one end engaged with the bellcrank and the other with one of the lugs in which pin 108 is mounted, holds the bellcrank in the illustrated position. The other arm, which extends more or less horizontally backward from the panel, has a lug 109 resting upon the curved upper surface 122 of a lever 110, pivoted at 111 intermediate its ends to lugs on panel 78. The upper end of lever 110 is concentric with pivot 111. The lower end of the lever carries a roll 110', which rides on the periphery of a cam 112 fixed to shaft 88. This cam has three dwell surfaces 113, 114 and 115, concentric with shaft 88 but located at different radial distances therefrom, increasing progressively in the order named. A spring 116, coiled around the hub of lever 110 with its ends engaging one with the lever and the other with one of the lugs in which the lever is pivoted, tends to hold the roll 110' engaged with cam 112. Normally, this roll is engaged with the lowest dwell surface 113 but the shaft 88 can be turned to move lever 110 far enough to bring roll 110' onto the second dwell surface 114 as will be clear from Fig. 13. However, further turning of the cam will be prevented by the abutment of a lug 117 on lever 110 with the lug 109. This condition is shown in Fig. 21. Now, if the pointers of the register have been reset to zero and knob 79 has been turned to cause axially inward movement of shaft 96, the hub 102 will move bellcrank 107 and lift lug 109 far enough to clear the top of lug 117. Thereupon, a latch arm 118, also pivoted on pin 111 and urged to swing in a clockwise direction by a spring 119, will swing against the side of lug 109 and a latching surface 120 thereof will swing in under the lug 109 to support it. This condition is shown in Fig. 19. The spring 119 is coiled around the hub of lever 110 with its ends engaged one with the arm 118 and the other with the other of the two lugs in which pin 111 is mounted. The shaft 88 may now be turned far enough to cause the switch of the pump motor to be closed, to do which it is necessary for the roll 110' to ride up on the dwell surface 115.

To prevent the operator from stopping the pump and again starting it without resetting the pointers of the registers, the lug 117 is made to move in under and support the lug 109 and the latch arm 118 is moved to the left by a pin 121 on lever 110 far enough to withdraw surface 120 from beneath lug 109. As the roll 110' rides up to surface 115, the pin 121 will engage arm 118 and move its surface 120 out from under the lug 109 and at the same time move lug 117 beneath lug 109. This condition is shown in Fig. 20. The radial distance from the axis of pin 111 to the curved top of lug 117 is slightly less than the corresponding distance to the surface 120. Consequently, if one attempts to turn shaft 88 back (clockwise), the surface 120 cannot again slide in under lug 109 as lug 117 slides out from beneath it. The right hand edge of arm 118, at a point just beneath surface 120, will strike the left hand side of lug 109 as will be clear from Fig. 20. Thus, the lug 109 is forced to drop back on the surface 122 of lever 110 and it will thus be impossible to again turn shaft 88 counterclockwise to the extent necessary to turn on the motor switch, without first repeating the resetting cycle of operation of knob 79. The pointers of the register must be reset and knob 79 turned an additional distance after the pointers have reached zero position, before lug 109 can be raised.

Previous to actuation of the pump, it is essential to interrupt the resetting transmission between knob 79 and register shaft 32. As herein shown, the gear 64 is disengaged from its mating gear 63 by moving its shaft 65 axially outward (to the right in Fig. 7 and to the left in Fig. 13). To thus move this shaft, the lever 110 has a portion formed as a clutch fork (Fig. 12) to straddle sleeve 94 and provide a pair of rounded surfaces 123 (Fig. 13), one on each side of the sleeve, to bear against flange 95. Thus, when cam 112 is turned far enough to carry the roll 110' onto the dwell surface 114, the flange 95 and its sleeve 94 and the attached shaft 65 will be drawn out to the extent necessary to disengage the gear 64 from gear 63. This disengagement of the gears can be effected without first raising lug 109 out of its locking position but the cam 112 cannot be turned far enough to start the pump until lug 109 has been thus lifted. And the lug 109 cannot be lifted until the gears have been again engaged, because in order to lift the lug relative movement between cam member 98 and shaft 96 must occur and such relative movement cannot occur until shaft 65 is held stationary. The only means for thus holding shaft 65 is the zero stop 58 for arresting shafts 31 and 32. Thus, the operator, if he has moved lever 80 in a clockwise direction from the illustrated position, previous to actuating the knob 79 far enough to release lug 109, must move the lever 80 back to the illustrated position and first actuate knob 79 in the planned way.

The transmission between the control element,—the motor switch 2',—and its operating member 80 includes in addition to the elements 83 84, 87 and 88, a positive motion cam 124 (Fig. 15) fixed to cam shaft 88. The periphery of this cam is engaged at angularly spaced points by two rolls 125 carried by and mounted between a pair of bell crank levers 126, disposed one on each side of the cam (Fig. 12) and pivoted at 127 to a lug on panel 78 and disposed between the bellcranks. By turning cam 124, bellcranks 126 will be positively moved back and forth. The switch operating lever 128 is pivotally mounted, at a point intermediate its ends, on a pin 129 fixed to the outer end of the horizontal arm of one bellcrank 126. Its outer end is connected by a link 130 to the switch 2' (Fig. 1). The complete transmission between the operating member 80 and the control element 2' thus comprises shaft 83, gears 84 and 87, cam shaft 88, cam 124, levers 126 with their rolls 125, lever 128 and its connection 129 to one bellcrank 126, and the link 130. With the lever 128 positioned as shown in Fig. 15, the switch 2' is open and the pump motor stopped. When raised as far as possible by cam 124, the switch will be closed and the pump motor started. This condition is shown in Fig. 18. The rear end of lever 128 carries a roll 132 which is normally engaged by the lower end of a latch arm 133, the upper end of which is fixed to a pin 134, mounted to turn in a lug on the back face of panel 78. The roll 132, when engaged by the latch, is so held that its axis coincides with the axis of the pivot 127 of bellcranks 126. Consequently, lever 128 then acts as if it were a part of the bellcranks 126 and it moves up and down in unison therewith (compare Figs. 15 and 18). When lever 80 is actuated to turn shaft 88 far enough to carry the roll 110' onto the dwell surface 115 of cam 112, cam 124 will be turned counterclockwise far enough to raise lever 128 into the position of Fig. 18 and close the switch 2'. But if, when the lever 128 is in this raised and switch-closing position, the latch 133 be swung in a counterclockwise direction far enough to release roll 132, the lever will swing about pin 129 and its outer end will be moved downwardly far enough to open the switch 2'. This condition is shown in Fig. 17. The members 126 and 128 of the aforesaid transmission between member 80 and control element 2' are thus so interconnected that one of them,—the member 128,—can, when latch 133 is released, move into position to cause the control element to move into flow stopping position, while the other,—bellcranks 126,—remains in the position which it occupies when the control element is in flow starting position. Such members 126 and 128 are normally held against such relative movement by a suitable releasable means,—in this case the latch 133,—so that both members move in unison.

This latch 133 is arranged to be released by a so-called limit control or predetermining means, so that the pump is stopped after a certain predetermined quantity of liquid has been delivered. Such means is driven directly from the meter and at a rate proportional to the rate at which liquid is forced therethrough by the shaft 77, one end of which is shown in Figs. 10 and 13. Such end is received in the open rear end of a sleeve 135, which has axially directed slots 136 to receive the projecting ends of a pin 137, fixed in and passing diametrically through shaft 77. This pin serves as a driving connection between the shaft and sleeve and also to secure to the shaft a collar 138, having a partly spherical surface engaged in the bore of the sleeve. The connection of shaft and sleeve is thus made by the equivalent of a ball and socket joint but with this difference, that the sleeve can slide axially to a limited extent. The sleeve 135 is slidably and rotatably mounted on a long stud 139 fixed at its outer end in panel 78. At its front end the sleeve has a clutch element 140 cooperating with a clutch element 141 on a disc 142. Intermediate its ends, the sleeve has a flange 143 serving as a clutch collar for engagement by a clutch shifting fork. The disk 142 is rotatably supported from stud 139 through the intermediary of a ball bearing 144, whereby the disc will turn easily. A companion disc 145 is mounted to turn on stud 139 but it is normally held stationary, as by the pin 146, fixed in panel 78 and engaging in a hole 147 formed in disc 145. Other holes, as many as desired, may be provided at angularly spaced points on disc 145, whereby the latter may be fixed in various positions of angular adjustment. Two such holes are shown at 148. The two discs 142 and 145 are interconnected by a spiral spring 149, one end of which is fixed to a pin 150 on disc 145 and the other end of which is fixed to the hub 151 of disc 142. The spring 149 is located between the two discs and housed in by peripheral flanges 142' and 145' thereon. The disk 145 has on its inner face a lug 153 (Fig. 11) adapted to abut a corresponding lug 152 on disc 142 and stop the disc 142 in its return movement effected by spring 149. The disc 142 is driven by shaft 77 in the direction of the arrow shown in Fig. 11 and spring 149 is wound up. When the clutch elements 140 and 141 are disengaged, disc 142 is rotated in the opposite direction by spring 149 until lug 152 abuts lug 153.

The pivot pin 134 of latch 133 has fixed thereto an arm 154, to the free end of which is pivotally connected the lower end of a rod 155. The upper end of this rod is loosely guided in a bracket 156, fixed to panel 78. A spring 157, coiled around rod 155, acts between this bracket and a collar 158, fixed to the rod, to move the latter downwardly and thus hold latch 133 engaged with roll 132. The disc 142 of the limit control means carries a pin 159 on its outer face and, after a predetermined degree of operation of the meter 4, the disc 142 will have been moved sufficiently in the direction of the arrow shown in Fig. 12 to engage pin 159 with a rearwardly projecting part of collar 158 (see also Fig. 17) and lift the latter and rod 155 far enough to withdraw latch 133 from roll 132. Thereupon, lever 128 is released to swing about the pivot 129 and be moved by spring 162 into switch-opening position.

After the pump has been automatically stopped in this way by the release of latch 133, it may again be started and another predetermined quantity of liquid delivered, without the necessity of going through the described cycle of operation including resetting of the register and operation of handle 80. To accomplish this, means are provided for moving lever 128 back into switch-closing position, where it is again held by latch 133. The rear end of lever 128 is connected by a link 160 (Fig. 16) to the short arm of a bellcrank lever 161, mounted to turn on shaft 88. The long and depending arm of this bellcrank is connected by a spring 162 to panel 78 and the lower end thereof is adapted to engage the inner end of a rod 163, to the outer end of which knob 81 is fixed. When latch 133 is released (Fig. 17), spring 162 turns bellcrank 161 clockwise and pushes up on link 160, raising the rear end of lever 128. At the same time rod 163 is thrust forwardly as far as a collar 164 thereon will allow it to go. Consequently, by pushing in on knob 81, bellcrank 161 can be moved in a counterclockwise direction to draw down the rear end of the lever 128 until the roll 132 is so positioned that latch 133 can be moved in by spring 157 to hold it.

Before the pump is operated, after having been stopped automatically in the manner described, it is necessary to reset the limit control disc 142. This is accomplished by disengaging the clutch elements 140 and 141, whereupon spring 149 returns the disc to its initial position, defined by the engagement of lugs 152 and 153. The release of the clutch is effected by a cam 165, fixed to the hub of bellcrank 161 and thus turning freely on shaft 88. Cam 165 is engaged by the lower end of a lever 166 which is pivoted intermediate its ends at 167 to panel 78 and the upper end of which is formed as a clutch shifting fork for engagement with flange 143. When latch 133 is released the spring 162 turns this cam with the bellcrank 161 and actuates lever 166 to disengage the clutch elements 140 and 141. Thus, disc 142 will be permitted to move by spring 149 to carry pin 159 back into its initial position shown in Fig. 12. Before the pump is again started, these clutch elements are again engaged in the act of moving bellcrank 161 by the knob 81 to move lever 128 to switch-closing position.

Means are provided for disengaging the clutch elements 140 and 141 of the limit-control disc 142, in the event that the pump is stopped before the predetermined quantity, for which the limit control is set, is delivered. Such means comprises a cam 168, mounted alongside cam 165 in position to engage lever 166 but fixed to shaft 88. This cam is so set on its shaft that it will move lever 166 and release the clutch of the limit control disc 142 just as the control handle 80 is moved into its vertical and inactive position. Cam 168 will not release such clutch until after the motor switch 2' has been opened. In Fig. 13, the cam 168 is shown as holding lever 166 in clutch releasing position. When handle 80 is moved to start the pump, the cam 168 will be moved to allow the limit control clutch to be engaged before the motor switch is closed.

The operation of the apparatus will next be described. When the apparatus is not in use, the hose nozzle 10 is supposed to be placed on its support 14, as shown in Figs. 1 to 3, and is usually locked thereto by a padlock passed through the perforation 16 of lug 15. The entire apparatus is then locked against operation. Lever 80 cannot be moved any substantial amount in either direction, being prevented from clockwise movement by the abutment of lug 91 with shoulder 92 (Fig. 4) and from movement in the other direction by the abutment of lug 90 with the guard 13 of the hose nozzle. The hose nozzle holds lever 80 in the position shown in Figs. 9 and 12, thus preventing movement of the cam shaft 88. The resetting transmission is effective, by turning knob 79, to reset the pointers 26 and 27 to zero but, even if this knob were turned for this purpose and then given the described additional turning movement necessary, after the pointers have reached zero, to withdraw locking lug 109 from the path of lug 117, the pump cannot be operated. Nothing will occur if knob 81 is pushed in. In case the operator did not reset the latch 133, after the pump has been stopped automatically by the limit control, all that could be accomplished by pushing in knob 81 would be the resetting of such latch. The motor switch would still be open.

The normal operation consists in removing the hose nozzle to free lever 80 for movement; operation of knob 79 to reset the pointers to zero and also to raise locking lug 109 out of the path of lug 117, or into the position shown in Fig. 19; and then actuation of the lever which is then completely free for movement. As lever 80 is turned in a counterclockwise direction (Fig. 9), it turns shaft 88 in a counterclockwise direction as viewed in Figs. 13 to 18. The first action which occurs is the movement of cam 168 to allow lever 166 to move far enough to engage the clutch elements 140 and 141 of the limit control disc 142. Immediately following this step, the roll 110' will ride up the first rise on cam 112 and move lever 110 far enough to disengage the gears 63 and 64 and thus interrupt the resetting transmission,— rendering any subsequent turning of knob 79 entirely futile. Continued movement of lever 80 in the same direction will next move lever 110 to position lug 117 in under lug 109 and move the latch 118 out of holding engagement therewith, the parts then occupying the relative positions shown in Fig. 20. The motor switch does not close until after the parts of the locking mechanism have assumed the positions of Fig. 20. Consequently, it is impossible for the operator to start the pump and then move handle 80 back in an attempt to cheat the customer. If he does turn handle 80 back, the lever 110 will be swung to the right and lug 109 will drop down onto surface 122, so that the lever 80 cannot again be moved in the direction necessary to start the pump without first operating the reset knob 79 to raise lug 109. And in this act, the pointers 26 and 27, if not at zero, will be moved to zero. The last step in the normal counterclockwise movement of handle 80 is to close the motor switch 2'. After the precautionary means of Fig. 20 have been set to compel resetting movement of knob 79 in case backward movement of lever 80 is attempted, the cam 124 will lift lever 128 and eventually close switch 2'. The closing of the switch occurs almost at the very end of the counterclockwise movement of lever 80. Operation of the pump then ensues and liquid is delivered through the hose 8 and nozzle 10 and the quantity delivered is indicated by the pointers 26 and 27, all in the usual manner.

The operation of the apparatus continues until it is stopped by the hand control or the automatic control. In case the quantity desired is less than that for which the limit control is set, then the operator simply closes off the hose nozzle valve when the pointers 26 and 27 show that the desired quantity has been delivered. He then opens switch 2' by turning lever 80 in a clockwise direction as viewed in Fig. 9. The lever 80 has to be moved in such direction a substantial distance before the motor switch opens and far enough to insure that the lug 117 will have moved out from in under lug 109 so that the switch cannot be again closed without resetting the pointers 26 and 27 to zero. An ordinary form of toggle switch is used, necessitating a substantial angular movement of lever 128 and thus accounting for the angular spread between the switch-closing and switch-opening positions of levers 128 and 80. As the lever 80 is turned back, the locking lug 109 drops back into locking position; then the resetting transmission is again rendered effective; and finally the clutch elements 140 and 141 of the limit control disc 142 are disengaged, enabling the disc to be automatically returned to its initial position by spring 149. The hose nozzle 10 may then be hung up on support 14 and locked thereto. Unless the lever 80 is returned completely to its initial position (shown in Fig. 9), the hose nozzle cannot be hung up because of the interference presented by lug 90.

In the event that the customer desires the quantity for which disc 142 is set or a greater quantity, the operator allows the pump to operate until disc 142 has caused pin 159 to engage and lift collar 158, thereby releasing latch 133 and allowing lever 128 to be moved by spring 162 to the switch-closing position shown in Fig. 17. By the movement of this lever, cam 165 is turned, through link 160 and bellcrank 161, to engage lever 166 and disengage the clutch elements 140 and 141 of the limit control disc 142, whereby the disc is restored to its initial position by spring 149. Then, if an additional quantity is desired, the operator simply presses in on knob 81, whereby lever 128 is moved into switch-closing position and held there by latch 133. Any desired number of cycles of operation of the apparatus may thus be effected and the total quantity of liquid delivered will be registered by the pointers 26 and 27. It is, however, necessary for the operator periodically to exercise some control over the apparatus and he is not free to leave the apparatus unguarded during the delivery of a large quantity of liquid, as he otherwise might do. The apparatus, as herein shown, is set to stop automatically at 10½ gallons.

Obviously, the quantity limit may be changed, as desired, as evidenced by the two holes 148 in disc 145 shown in Fig. 11, in either of which pin 146 may be engaged to set the device to cause automatic stopping of the pump after a quantity either greater or less than the stated quantity has been delivered. The "limit control" may likewise be used as a predeterminer, enabling the apparatus to be set for the delivery of any quantity desired.

It is recognized that after the apparatus has been stopped by the automatic means, the operator might fail to hang up the hose nozzle 10 and might leave lever 80 in the "On" position. The pointers 26 and 27 would then indicate the quantity last delivered, in this case 10½ gallons or some multiple thereof. Then, when a succeeding customer is to be served, he could start up the pump without resetting the pointers to zero, by simply pushing in on knob 81. The danger of fraud on the customer because of the possibility of such practice is deemed much less important than the danger of the operator leaving the apparatus unattended during the delivery of a large quantity of gasoline. The cheating of customers by fraudulent manipulation of the register usually involves small amounts of gasoline. In this case, the least amount would be 10½ gallons and the fraud would be so liable to be discovered that it would not be likely to be attempted. Besides, the customer is supposed to exercise the reasonable precaution of making sure that the register is reset to zero before the pump is started.

Thus, the invention provides an improved mechanism for compelling the resetting of the quantity-indicating elements of the meter to zero position before liquid can be delivered from the apparatus under the normal control. It also provides a mechanism for limiting the maximum quantity of liquid which can be delivered from the apparatus and thus compels occasional attention by the operator during the delivery of relatively large quantities of liquid.

What I claim is:

1. In a liquid dispensing apparatus, a dispensing conduit, a meter interposed therein to measure the quantity of liquid dispensed therethrough, a movable indicator driven by the meter and indicating said quantity, means for effecting flow of liquid through said conduit and meter, a control element movable to start and stop said flow, an operating member for said control element, a transmission connecting said element and operating member, said transmission including two members interconnected for the movement of one into position to cause movement of said element into flow-stopping position while the other remains in the position it occupies when said element is in flow starting position, and releasable means normally holding said members against relative movement, whereby both members move in unison.

2. In a liquid dispensing apparatus, a dispensing conduit, a meter interposed therein to measure the quantity of liquid dispensed therethrough, a movable indicator driven by the meter and indicating said quantity, means for effecting flow of liquid through said conduit and meter, a control element movable to start and stop said flow, an operating member for said control element, a transmission connecting said element and operating member, said transmission including two members interconnected for the movement of one into position to cause movement of said element into flow-stopping position while the other remains in the position it occupies when said element is in flow starting position, releasable means normally holding said members against relative movement, whereby both members move in unison, and means driven by said meter for releasing the last-named means after a predetermined quantity of liquid has been dispensed and enabling said one member to move relatively to the other to cause stopping of the flow without movement of said operating member.

3. In a liquid dispensing apparatus, a dispensing conduit, a meter interposed therein to measure the quantity of liquid dispensed therethrough, a movable indicator driven by the meter and indicating said quantity, means for effecting flow of liquid through said conduit and meter, a control element movable to start and stop said flow, an operating member for said control element, a transmission connecting said element and operating member, said transmission including two members interconnected for the movement of one into position to cause movement of said element into flow-stopping position while the other remains in the position it occupies when said element is in flow starting position, releasable means normally holding said members against relative movement, whereby both members move in unison, a member movable from an initial position to another position to release said releasable means, a transmission between the meter and last-named member for thus moving said last named member, means for interrupting the last named transmission, and means operable on interruption of the last-named transmission to return the last-named member to its initial position.

4. In a liquid dispensing apparatus, a dispensing conduit, a meter interposed therein to measure the quantity of liquid dispensed therethrough, a movable indicator driven by the meter and indicating said quantity, means for effecting flow of liquid through said conduit and meter, a control element movable to start and stop said flow, an operating member for said control element, a transmission connecting said element and operating member, said transmission including two members interconnected for the movement of one into position to cause movement of said element into flow-stopping position while the other remains in the position it occupies when said element is in flow starting position, releasable means normally holding said members against relative movement, whereby both members move in unison, a member movable from an initial position to another position to release said releasable means, a transmission between the meter and last-named member for thus moving such member, means operable on the release of the releasable means to interrupt the last-named transmission, and means operable on interruption of the last-named transmission to return the last-named member to its initial position.

5. In a liquid dispensing apparatus, a dispensing conduit, a meter interposed therein to measure the quantity of liquid dispensed therethrough, a movable indicator driven by the meter and indicating said quantity, means for effecting flow of liquid through said conduit and meter, a control element movable to start and stop said flow, an operating member for said control element, a transmission connecting said element and operating member, said transmission including two members interconnected for the movement of one into position to cause movement of said element into flow-stopping position while the other remains in the position it occupies when said element is in flow starting position, releasable means normally holding said members against relative movement, whereby both members move in unison, a member movable from an initial position to another position to release said releasable means, a transmission between the meter and last-named member for thus moving such member, means operable on the release of the releasable means to interrupt the last-named transmission, means operable on interruption of the last-named transmission to return the last-named member to its initial position, and means operable independently of said interrupting means to interrupt said last-named transmission on movement of said control element by said operating member into flow stopping position.

6. In a liquid dispensing apparatus, a dispensing conduit, a meter interposed therein to measure the quantity of liquid dispensed therethrough, a movable indicator driven by the meter and indicating said quantity, means for effecting flow of liquid through said conduit and meter, a control element movable to start and stop said flow, an operating member for said control element, a transmission connecting said element and operating member, said transmission including two members interconnected for the movement of one into position to cause movement of said element into flow-stopping position while the other remains in the position it occupies when said element is in flow starting position, releasable means normally holding said members against relative movement, whereby both members move in unison, a member movable from an initial position to another position to release said releasable means, a transmission between the meter and last-named member for thus moving such member, means operable on the release of the releasable means to interrupt the last-named transmission, means operable on interruption of the last-named transmission to return the last-named member to its initial position, and manually operable means for returning the transmission members into position to be held against relative movement by said releasable means.

7. In a liquid dispensing apparatus, a dispensing conduit, a meter interposed therein to measure the quantity of liquid dispensed therethrough, a movable indicator driven by the meter and indicating said quantity, means for effecting flow of liquid through said conduit and meter, a control element movable to start and stop said flow, an operating member for said control element, a transmission connecting said element and operating member, said transmission including two members interconnected for the movement of one into position to cause movement of said element into flow-stopping position while the other remains in the position it occupies when said element is in flow starting position, releasable means normally holding said members against relative movement, whereby both members move in unison, a member movable from an initial position to another position to release said releasable means, a transmission between the meter and last-named member for thus moving such member, means operable on the release of the releasable means to interrupt the last-named transmission, means operable on interruption of the last-named transmission to return the last-named member to its initial position, and manually operable means for returning the transmission members into position to be held against relative movement by said releasable means and reestablishing the second-named transmission.

8. In a liquid dispensing apparatus, a dispensing conduit, a meter interposed therein to measure the quantity of liquid dispensed therethrough, a movable indicator driven by the meter and indicating said quantity, means for effecting flow of liquid through said conduit and meter, a control element movable to start and stop said flow, an operating member for said control element, a transmission connecting said element and operating member, said transmission including two members interconnected for the movement of one into position to cause movement of said element into flow-stopping position while the other remains in the position it occupies when said element is in flow starting position, releasable means normally holding said members against relative movement, whereby both members move in unison, a member movable from an initial position to another position to release said releasable means, a transmission between the meter and last-named member for thus moving such member, means operable on the release of the releasable means to interrupt the last-named transmission, means operable on interruption of the last-named transmission to return the last-named member to its initial position, manually operable means for returning the transmission members into position to be held against relative movement by said releasable means and reestablishing the second-named transmission, and a second means operable by movement of said actuating means to interrupt the second named transmission means before the control element is moved to flow stopping and reestablish such transmission before the control element is again moved to flow starting position.

9. In a liquid dispensing apparatus, a dispensing conduit, a meter interposed therein to measure the quantity of liquid dispensed therethrough, a movable indicator driven by the meter and indicating said quantity, means for effecting flow of liquid through said conduit and meter, a control element movable to start and stop said flow, an operating member for said control element, a transmission connecting said element and operating member, said transmission including two members interconnected for the movement of one into position to cause movement of said element into flow-stopping position while the other remains in the position it occupies when said element is in flow starting position, releasable means normally holding said members against relative movement, whereby both members move in unison, means driven by said meter for releasing the last-named means after a predetermined quantity of liquid has been dispensed and enabling said one member to move relatively to the other to cause stopping of the flow without movement of said operating member, and means operable independently of said actuating means to reset said members in position to be held against relative movement by said releasable means.

10. In a liquid dispensing apparatus, a dispensing conduit, a meter interposed therein to measure the quantity of liquid dispensed therethrough, a movable indicator driven by the meter and indicating said quantity, means for effecting flow of liquid through said conduit and meter, a control element movable to start and stop said flow, an operating member for said control element, a transmission connecting said element and operating member, said transmission including two members interconnected for the movement of one into position to cause movement of said element into flow-stopping position while the other remains in the position it occupies when said element is in flow starting position, releasable means normally holding said members against relative movement, whereby both members move in unison, means driven by said meter for releasing the last-named means after a predetermined quantity of liquid has been dispensed and enabling said one member to move relatively to the other to cause stopping of the flow without movement of said operating member, means for automatically locking said actuating means when moved into position to cause said control element to stop said flow from again moving into position to cause said control element to start said flow, means for resetting said indicator to initial position, and means actuated by said resetting means after the indicator has been reset to release said locking means.

11. In a liquid dispensing apparatus, a dispensing conduit, means for forcing liquid therethrough, a control element movable to start and stop said flow, an operating member for said element; a transmission between the operating member and element including a cam movable by the operating member, a pivoted lever actuated by the cam, a second lever pivoted intermediate its ends to the first lever and connected at one end to the control element, a pin on the other end of the second lever; a latch engaging said pin and holding it with its axis in alinement with the axis of the pivot of the first lever, and means operable after a predetermined quantity has been dispensed from said conduit to withdraw said latch from holding engagement with said pin, whereby the second lever can move independently of the first lever and position said element to stop said flow even though the first lever has been moved by said operating member and cam into position to hold said element in flow starting position.

12. In a liquid dispensing apparatus, a dispensing conduit, means for forcing liquid therethrough, a control element movable to start and stop said flow, an operating member for said element; a transmission between the operating member and element including a positive motion cam movable by the operating member, a pivoted lever positively actuated by the cam in both directions, a second lever pivoted intermediate its ends to the first lever and connected at one end to the control element, a pin on the other end of the second lever; a latch engaging said pin and holding it with its axis in alinement with the axis of the pivot of the first lever, whereby both levers normally move in unison and positively move said element between its flow starting and flow stopping positions and vice versa, means operable after a predetermined quantity has been dispensed from said conduit to withdraw said latch from holding engagement with said pin; and means for moving said second lever, when released, independently of the first lever and operable to move said element to flow stopping position when it had theretofore been held in flow starting position by said operating member, said cam and first lever.

13. In a liquid dispensing apparatus, a dispensing conduit, means for forcing liquid therethrough, a control element movable to start and stop said flow, an operating member for said element; a transmission between the operating member and element including a positive motion cam movable by the operating member, a pivoted lever positively actuated by the cam in both directions, a second lever pivoted intermediate its ends to the first lever and connected at one end to the control element, a pin on the other end of the second lever; a latch engaging said pin and holding it with its axis in alinement with the axis of the pivot of the first lever, whereby both levers normally move in unison and positively move said element between its flow starting and flow stopping positions and vice versa, means operable after a predetermined quantity has been dispensed from said conduit to withdraw said latch from holding engagement with said pin, means for moving said second lever, when released, independently of the first lever and operable to move said element to flow stopping position when it had theretofore been held in flow starting position by said actuator operating member, said cam and first lever, manually-operated means for moving the second lever back into position to be held by said latch, and means for moving the latch into holding relation with said pin.

14. In a liquid dispensing apparatus, a meter, means for effecting flow of liquid through the meter, a control element to start and stop said flow, an operating member for said element, a transmission between said element and member, locking means automatically operable when said element is moved into position to stop said flow to prevent it from being again moved into position to start said flow, a quantity indicator, a shaft therefor driven in one direction by said meter and capable of being turned in the opposite direction to reset the indicator, a resetting shaft, means for coupling and uncoupling said shafts, a stop to arrest the indicator shaft when turned in the last-named direction when the indicator reaches zero position, a member manually movable in one direction to turn the resetting shaft and the indicator shaft coupled thereto and capable of continued movement in the same direction relatively to the resetting shaft after the indicator shaft has been arrested by said stop, and means operable by the movement of said last-named member relative to the resetting shaft to release said locking means.

15. In a liquid dispensing apparatus, a meter, means for effecting flow of liquid through the meter, a control element to start and stop said flow, locking means automatically engageable with said element when moved into position to stop said flow to prevent it from being again moved into position to start said flow, a quantity indicator, a shaft therefor driven by the meter, resetting means for said indicator including a shaft having two alined and constantly coupled shaft sections mounted in telescoping relation so that one may slide axially relatively to the other, means for coupling one such section to and uncoupling it from the indicator shaft, a stop to arrest the indicator shaft when turned by the resetting means after the indicator has reached its zero position, a cam and a member for manually turning it loosely mounted on the other of said sections, a cam follower fixed to the last named section, resilient means holding the follower engaged with said cam, whereby said member may turn the sections of the resetting shaft and the indicator shaft when coupled thereto until the indicator is reset to zero and its shaft arrested by said stop, said member then operable to turn said cam relative to its shaft section and move the latter axially, and means operable by such axial movement of such shaft section to release said locking means.

16. In a liquid dispensing apparatus, a meter, means for effecting flow of liquid through the meter, a control element movable to start and stop said flow, a movable quantity indicator driven by the meter, a resetting transmission for moving the indicator back to zero position, a lever interconnected with the flow control element to move therewith and operable to render said transmission effective or ineffective to reset said indicator accordingly as said element is positioned to stop or start said flow, said lever having an abutment projecting from its upper end, a pawl normally urged into engagement with said upper end and in the path of said abutment when the lever is moved as the control element moves toward flow starting position, means operable by said transmission after the indicator has been reset to zero to move said pawl out of the path of said abutment, a latch automatically engageable with the pawl when thus moved to temporarily hold it in withdrawn position and enable movement of said lever and of the control element toward flow starting position, and a member on said lever for engaging said latch and moving it out of supporting relation with said pawl on such last-named movement of said lever as the abutment on the lever moves in under said pawl to support it, whereby on reverse movement of the lever the pawl will drop back on said lever into locking relation with said abutment.

WARREN H. DE LANCEY.